Patented Jan. 19, 1937

2,068,411

UNITED STATES PATENT OFFICE 2,068,411

HIGH-PRESSURE NONPLASTIC REFRACTORY AND METHOD OF MAKING THE SAME

Russell P. Heuer, Bryn Mawr, Pa., assignor to General Refractories Company, a corporation of Pennsylvania No Drawing. Application January 9, 1934, Serial No. 705,955

14 Claims. (Cl. 25—156)

My invention relates to bonded unburned refractory brick made from anhydrous non-plastic refractory materials, and to methods of manufacturing the same. This application is a continuation in part of my application Serial No. 323,890, filed December 5, 1928, part of the subject matter of which is embodied in U. S. Patent No. 1,992,482, for High-pressure brick containing magnesia and process of making the same, and U. S. Patent No. 1,992,483, for High pressure chrome refractory, both granted February 26, 1935.

A purpose of my invention is to produce, from anhydrous materials, an unburned non-plastic refractory brick which is equal or superior in hot and cold strength, density, resistance to metal and slag penetration and refractoriness to the burned non-plastic refractory brick of the prior art.

A further purpose is to produce, from anhydrous materials, an unburned non-plastic refractory brick which, by virtue of the combination of definite proportions of larger and smaller graded sizes, and the presence of the bond, has a high strength while the brick is at atmospheric temperatures, and which, by virtue of the small amount of bond, is refractory at the high temperature of use.

A further purpose is to bond an unfired non-plastic refractory brick of very high density and very low porosity made from anhydrous materials without reducing the strength of the brick at high temperatures or rendering the brick less refractory.

A further purpose is to use from 45% to 65% (preferably from 52% to 58%, or better 55%) of larger anhydrous non-plastic refractory particles between 3 and 30 mesh per linear inch (preferably between 6 and 30, or better between 10 and 30 or 10 and 20 mesh per linear inch) and from 55% to 35% (preferably from 48% to 42%, or better 45%) of smaller anhydrous non-plastic refractory particles through 50 mesh per linear inch (preferably through 60, or better 80 mesh per linear inch), with an appreciable but small amount of bond, in non-plastic refractory brick, and to subject the mixture of the non-plastic particles and the bond, to moulding pressure high enough to form the mixture into a brick.

A further purpose is to employ a water soluble bond which can easily be distributed very uniformly and in small quantity among anhydrous non-plastic particles of properly graded sizes and will not have a tendency to space individual particles and thus increase the tendency of the brick to shrink at high temperature.

Further purposes appear in the specification and in the claims.

My invention relates to the methods involved and to the products obtained.

As explained in my U. S. Patent No. 1,851,181, for Dense mix for refractories and process of preparing the same, granted March 29, 1932, brick of high density and low porosity may be obtained from many non-plastic refractory materials by grading the particles into larger and smaller sizes, with the partial or complete elimination of intermediate sizes, combining the larger and smaller sizes in definite proportions by weight and desirably molding under high pressure. According to my Patent No. 1,851,181, the introduction of material which will cause plastic flow either in the hot or cold brick is undesirable and likely to defeat the purposes sought.

Where an unburned brick is to be made, there is, however, a definite advantage in introducing a bond into a mix of the type disclosed in my Patent No. 1,851,181, providing the quantity of bond is limited. Between the complete or substantial absence of bond, on the one hand, and the condition in which the bond causes plastic flow in the hot or cold brick, on the other hand, there is a range of bond content which is beneficial to the brick. The amount of bond present in this optimum range of bond content is such that the bond exerts a definite and beneficial influence on the unburned brick and at the same time does not encourage shrinkage or plastic flow in either the hot or the cold brick.

My present problem is to introduce a bond into a mass of particles, properly graded and combined to make a brick of high density, in such a way that the properties of the brick are not harmfully influenced, and particularly that the brick is not rendered liable to shrinkage.

It is possible to make a wholly satisfactory unburned brick from non-plastic refractory materials without using any bond, provided the sizes are properly graded and combined, and suitable molding procedure is used. If, to the properly graded and combined non-plastic mix, a small amount of bond be added, a definite improvement in the unburned brick will be noted, particularly in its strength before being subjected to furnace temperature, its subsequent cold and hot strength, and its resistance to spalling, with little or no change in its refractoriness. Upon the addition of still more bond, it will be found that the unburned brick has been harmfully influenced, especially by rendering it markedly more fusible, much weaker at furnace temperature, much less resistant to spalling, to abrasion, to molten slags, to metals and to hot products of combustion, or decidedly more subject to pronounced shrinkage. The strength of the unburned brick before it is subjected to furnace temperature may even increase where excessive bond is present, but the loss of the high temperature properties due to the larger quantity of bond is too great a cost to pay for increased strength in the unburned condition.

In an unburned brick made from graded and combined non-plastic particles, there is then an optimum range of bond content. Without limiting myself to any theory, I may say that I suppose that the optimum range of bond content is due to the fact that, as soon as the bond is present in great enough quantity to actually space one non-plastic refractory particle from another, it encourages plastic flow, rendering the brick much more fusible, less resistant to spalling, weaker at high temperatures and more liable to shrinkage. Where the bond is present in such small amount that it merely forms a coating or film on the non-plastic particles, it does not substantially space them, does not assist plastic flow and does not reduce the high temperature properties. With a water soluble bond, it is easy to introduce a small quantity and distribute it uniformly.

An insoluble bond, such as clay, is difficult to distribute uniformly, so that it will not separate particles and subsequently permit shrinkage. Likewise, it is very difficult to introduce a small enough quantity of an insoluble bond with any degree of uniformity.

I eliminate or substantially eliminate intermediate size particles and combine the larger and smaller sizes as discussed in my Patent No. 1,851,181, thus producing a brick of great density and correspondingly little void space. I may apply my invention to any suitable anhydrous non-plastic refractory, as for example chrome ore, magnesia (calcined magnesite), cyanide, andalusite, sillimanite, corundum, olivine, silicon carbide, zirconia, zirconium silicate, and silica (ganister). I may also apply my invention to compatible mixtures of these non-plastic refractories, as for example mixtures of magnesia and chrome, or magnesia and olivine, in any proportions.

In order to obtain a maximum of interfitting of the non-plastic particles, I grade the sizes of the ground refractory for making up the brick mix into larger, intermediate and smaller particles. As only the larger and smaller particles are used in the brick, the intermediates may be reground to make smaller particles, or the system of grinding may be so regulated that only larger and smaller particles are produced. Obviously, if separate sources of larger and smaller particles are available, the particles from such separate sources may be used.

The particles employed must be non-plastic and anhydrous. Plastic particles such as the hydrous alumina-silica minerals have colloidally associated and combined water which renders the production of an unburned brick of high density and low porosity a difficult problem. The colloidally associated water and the combined water are driven off in drying and during use. An unburned brick made from hydrous alumina-silica minerals is apt to shrink and develop void spaces during use.

By anhydrous material I mean a material which occurs naturally without water of composition, or which is manufactured in the form of an artificial anhydrous material. I do not include calcined hydrous minerals, such as calcined bauxite, calcined diaspore, calcined fire clays, calcined kaolin, calcined soapstone, etc., which retain some porosity due to the previous removal of the moisture. I find that the treatment of such substances must be specifically provided for, as noted in my U. S. Patent No. 1,886,185, for Refractory brick and method, granted November 1, 1932.

The larger particles should be capable of passing a screen of 3 mesh per linear inch and of being retained upon a screen of 30 mesh per linear inch. The larger particles should preferably be between 6 and 30 mesh per linear inch, as best results are obtained when the larger particles are of nearly uniform graded size. Better results are obtained if the larger particles are between 10 and 30 mesh per linear inch, and still better results if they are between 10 and 20 mesh per linear inch. The smaller particles should be capable of passing through a screen of 50 mesh per linear inch, and preferably will pass 60 or better 80 mesh per linear inch. The intermediate particles, which are substantially eliminated, will be between 30 and 50 mesh per linear inch, or preferably between 30 and 60, 20 and 60, 30 and 80 or 20 and 80 mesh per linear inch.

Between 45% and 65% (preferably between 52% and 58%) of larger anhydrous non-plastic particles and between 55% and 35% (preferably between 48% and 42%) of smaller anhydrous non-plastic particles should be employed to produce brick of high density. The quantity of larger and smaller particles will be roughly equal. It is best to eliminate the intermediate particles, but some of them may be used. The quantity of intermediate particles should preferably be kept within 10%, or within 20% as a maximum. The most desirable mix comprises about 55% of larger particles and about 45% of smaller particles, reductions in these percentages being made for the bond.

The bond to be used should be chosen with reference to the individual non-plastic refractory. The quantity of water soluble bond should be appreciable but should not in any case exceed 5% of the dry brick. For chrome ore, magnesia, cyanite, andalusite, sillimanite, corundum, olivine, silicon carbide, zirconia, zirconium silicate and ganister, sodium silicate is a suitable bond. The amount of sodium silicate should be appreciable but should preferably be less than 3% (5% maximum), or better, less than 2%. The refractories above referred to may be bonded with organic bonds such as dextrine, gum arabic or sulphite liquor, of which an appreciable quantity, preferably less than 3% (5% maximum), or better, less than 2%, or still better, less than 1% will be used.

Magnesia and mixtures of magnesia and chrome may be bonded by sodium acid sulphate (sodium bisulphate) or sodium dichromate, in the presence of clay, as explained in my U. S. Patent No. 1,859,512, for Refractory and method of making it, granted May 24, 1932. The acid electrolyte should be appreciable but should preferably form only 2% or less (5% maximum) of the dry brick, and the clay about 2% of the dry brick, and certainly less than 5%.

Mixtures of magnesia and chrome containing considerable chrome may be bonded by an acid electrolyte, such as sodium acid sulphate, in the presence of finely divided magnesia, as disclosed in my U. S. Patent No. 1,845,968, for Chrome refractory and its method of manufacture, granted February 16, 1932. I will preferably use about 2% or less (5% maximum) of sodium acid sulphate, with about 10% of finely divided magnesia particles for bonding purposes.

I contemplate that conventional brick-making methods will be used. I have already explained how the non-plastic particles will be ground, graded as to size, and the larger and smaller sizes will be combined in the proper proportions. Prior to molding, the mix will be suitably moistened with the binder. Where a water-soluble binder such as sodium silicate or an organic substance (dextrine, gum arabic, sulphite liquor), is used, water will be employed to moisten the mix.

If desired the water solution of the binder may first be mixed with the smaller particles before the larger particles are added.

The use of high pressure for molding the brick is desirable, as the high pressure assists in producing maximum interfitting. I employ a molding pressure of at least 1000 pounds per square inch, and preferably 5000 or better 10,000 pounds per square inch.

After molding, the brick are dried, preferably at a temperature of 100° to 300° C. This results in driving off excess moisture, but is not in any sense a burning or firing operation. The brick are now ready for use in unburned condition.

I am aware that it is not new to bond certain anhydrous non-plastic refractories with sodium silicate or organic binders and to use such bonded brick in furnace linings without previous firing. I have found that such unburned brick are lacking in refractoriness or strength, in resistance to slag or metal attack, and have undesirably high porosity or shrink in volume in service due to poor contact and poor interfitting of the constituent particles and the presence of excessive amounts of bonding substance between the particles. By selecting the proper size particles and densely compacting them under pressure exceeding 1000 pounds per square inch, I have been able to obtain desirable brick having the necessary particle interfitting without burning and with a minimum of bonding substance. Such brick can be made equal to or better than conventional burned brick of the same material. One example of such a brick composition is:

| | Per cent |
|---|---|
| Dead burned magnesite | 76 |
| Chrome ore | 20 |
| Ball clay | 2 |
| Sodium acid sulphate | 2 |
| | 100 |

A screen test of the brick mix shows:

| | Per cent |
|---|---|
| On 6 mesh per linear inch | 0 |
| Thru 6 on 10 mesh per linear inch | 15 |
| Thru 10 on 20 mesh per linear inch | 20 |
| Thru 20 on 35 mesh per linear inch | 15 |
| Thru 35 on 65 mesh per linear inch | 5 |
| Thru 65 mesh per linear inch | 45 |
| | 100 |

When molded under a pressure of 10,000 pounds per square inch and dried at 125° C., such brick have shown a brick specific gravity as high as 3.0 and cold crushing strengths up to 14,000 pounds per square inch.

The following cold crushing strengths (in pounds per square inch) have been obtained for commercial brick made according to the present invention:

| | |
|---|---|
| Chrome | 6,000 |
| Magnesia | 8,000 |
| Andalusite | 4,000 |
| Silica | 3,000 |

As brick having a cold crushing strength of about 2000 pounds per square inch may be shipped and installed commercially, it will be evident that the unburned brick of my invention are amply strong. The brick according to my invention are very dense, having a porosity of less than 20%.

According to my invention, I procure larger and smaller particles of ground non-plastic refractory, add a limited quantity of a proper binder, ordinarily in a solution which serves to moisten the mix, mold the brick, preferably under high pressure, and dry the molded brick. The brick is then ready for use in unfired condition, and may be inserted in a furnace lining exactly like a fired brick.

In stating percentages of non-plastic particles, I of course intend that these percentages shall be subject to deduction for the percentage of bond. Thus the suggested ranges of 45% to 65% (preferably 52% to 58%) of larger anhydrous non-plastic particles and 55% to 35% (preferably 48% to 42% of smaller anhydrous non-plastic particles are subject to deductions in each case for the percentage of bond.

All percentages mentioned herein are percentages by weight unless the context clearly indicates that they are percentages by volume, as in the case of porosity, void space, etc. All percentages are based upon the dried unfired brick which is ready for use in a furnace lining. Thus when I refer to a certain percentage of water soluble bond, I do not include the water which is used as a vehicle for the bond, and to moisten the mix, when the bond is added, but merely mean that, of the dried unfired brick, the bond comprises a certain percentage by weight.

A typical analysis of a suitable magnesia or dead burned magnesite is:

| | Per cent |
|---|---|
| MgO (by difference) | 84.50 |
| CaO | 4.50 |
| Fe$_2$O$_3$ | 5.00 |
| Al$_2$O$_3$ | 1.50 |
| SiO$_2$ | 4.00 |
| Loss on ignition | 0.50 |
| | 100.00 |

If lower quality be permissible, the lime may be greater than 7% but should not be within the range of calcined dolomite. Magnesites may fall as low as 60% to 65% MgO content if higher amounts of CaO and Fe$_2$O$_3$ or other basic oxides are present. The magnesites may be prepared for use by dead burning in kilns at about 1500° C. or by electrical fusion.

Whenever I mention chrome, I mean chrome ore of the type used in making refractory brick or calcined chrome ore. Sodium acid sulphate (sodium bisulphate) as mentioned herein may be the "nitre cake" of commerce. Sodium silicate as used in my invention may be the liquid variety, "water glass", or the solid variety. When I speak of the amount of sodium silicate to be used as a bond, I refer to the quantity of anhydrous sodium silicate. If a solution of sodium silicate or a hydrated solid sodium silicate be used, an increased amount of binder will be necessary to compensate for the water present. Various commercial sodium silcates have different ratios of Na₂O to SiO₂, for example, 1:4; 1:2.4. Such silicates are all applicable as bonding agents.

When I state that the quantity of bond used is less than any specified percentage, I of course mean to indicate that an appreciable amount, less than that percentage, is employed.

In referring to my earlier patents, I intend to incorporate their disclosures herein by reference and make them a part hereof.

In view of my invention and disclosure variations and modifications to meet individual whim or particular need will doubtless become evident to others skilled in the art, to obtain all or part of the benefits of my invention without copying the structure shown, and I, therefore, claim all such in so far as they fall within the reasonable spirit and scope of my invention.

Having thus described my invention, what I claim as new and desire to secure by Letters Patent is:

1. The method of making a refractory of high density from anhydrous non-plastic material and a bonding substance, using anhydrous non-plastic particles of relatively larger and smaller grain sizes, which consists in mixing larger anhydrous non-plastic particles retained on a 30 mesh per linear inch screen with smaller anhydrous non-plastic particles and a bonding substance, while employing not more than a relatively small proportion of intermediate anhydrous non-plastic particles, in molding the mix in moist condition into a refractory shape, in drying the refractory shape and in subjecting the dried unburned refractory shape to firing temperature in a furnace structure during use.

2. The method of making a refractory of high density from anhydrous non-plastic material and a bonding substance, using anhydrous non-plastic particles of relatively larger and smaller grain sizes, which consists in mixing larger anhydrous non-plastic particles retained on a 30 mesh per linear inch screen with smaller anhydrous non-plastic particles and a bonding substance while employing not more than a relatively small proportion of intermediate anhydrous non-plastic particles, in molding the mix in moist condition under pressure into a refractory shape, in drying the refractory shape and in subjecting the dried unburned refractory shape to firing temperature in a furnace structure during use.

3. The method of making a refractory of high density from anhydrous non-plastic material and a bonding substance, using anhydrous non-plastic particles of relatively larger and smaller grain sizes, which consists in mixing larger anhydrous non-plastic particles retained on a 20 mesh per linear inch screen with smaller anhydrous non-plastic particles and a bonding substance, while employing not more than a relatively small proportion of intermediate anhydrous non-plastic particles, in molding the mix in moist condition under pressure into a refractory shape, in drying the refractory shape and in subjecting the dried unburned refractory shape to firing temperature in a furnace structure during use.

4. The method of making a refractory of high density from anhydrous non-plastic material and a bonding substance, using anhydrous non-plastic particles of relatively larger and smaller grain sizes, which consists in mixing larger anhydrous non-plastic particles retained on a 30 mesh per linear inch screen with smaller anhydrous non-plastic particles below 60 mesh per linear inch and a bonding substance, while employing not more than a relatively small proportion of intermediate anhydrous non-plastic particles, in molding the mix in moist condition under pressure into a refractory shape, in drying the refractory shape and in subjecting the dried unburned refractory shape to firing temperature in a furnace structure during use.

5. The method of making a refractory of high density from anhydrous non-plastic material and a water soluble bond, using anhydrous non-plastic particles of relatively larger and smaller grain sizes, which consists in mixing larger anhydrous non-plastic particles between 3 and 30 mesh per linear inch in the proportion of 45% to 65% with smaller anhydrous non-plastic particles below 50 mesh per linear inch in the proportion of 55% to 35%, and with an appreciable amount but less than 5% of a water soluble bond, maintaining the mixture free from insoluble bond, in molding the mixture in moist condition under a pressure exceeding 1000 pounds per square inch, in drying the mixture and in subjecting the dried unburned mixture to firing temperature in a furnace structure during use.

6. The method of making a refractory of high density from anhydrous non-plastic material and a water soluble bond, using anhydrous non-plastic particles of relatively larger and smaller grain sizes, which consists in mixing larger anhydrous non-plastic particles between 6 and 30 mesh per linear inch in the proportion of 45% to 65% with smaller anhydrous non-plastic particles below 50 mesh per linear inch in the proportion of 55% to 35%, and with an appreciable amount but less than 3% of sodium silicate, in molding the mixture in moist condition under a pressure exceeding 1000 pounds per square inch, in drying the mixture and in subjecting the dried unburned mixture to firing temperature in a furnace structure during use.

7. The method of making a refractory of high density from anhydrous non-plastic material and an organic bond, using anhydrous non-plastic particles of relatively larger and smaller grain sizes, which consists in mixing larger anhydrous non-plastic particles between 6 and 30 mesh per linear inch in the proportion of 45% to 65% with smaller anhydrous non-plastic particles below 50 mesh per linear inch in the proportion of 55% to 35%, and with an appreciable amount but less than 3% of an organic bond, in molding the mixture in moist condition under a pressure exceeding 1000 pounds per square inch, in drying the mixture and in subjecting the dried unburned mixture to firing temperature in a furnace structure during use.

8. A dry refractory body of anhydrous non-plastic material, said body having low porosity, being in unfired condition and suitable for use in unfired condition, and comprising a densely compacted mixture of larger anhydrous non-plastic particles capable of being retained on a screen of 30 mesh per linear inch and smaller anhydrous non-plastic particles capable of passing through a screen of 60 mesh per linear inch, in roughly equal proportions, and a bonding substance distributed through the densely compacted mixture.

electrolyte, such as sodium acid sulphate, in the presence of finely divided magnesia, as disclosed in my U. S. Patent No. 1,845,968, for Chrome refractory and its method of manufacture, granted February 16, 1932. I will preferably use about 2% or less (5% maximum) of sodium acid sulphate, with about 10% of finely divided magnesia particles for bonding purposes.

I contemplate that conventional brick-making methods will be used. I have already explained how the non-plastic particles will be ground, graded as to size, and the larger and smaller sizes will be combined in the proper proportions. Prior to molding, the mix will be suitably moistened with the binder. Where a water-soluble binder such as sodium silicate or an organic substance (dextrine, gum arabic, sulphite liquor), is used, water will be employed to moisten the mix.

If desired the water solution of the binder may first be mixed with the smaller particles before the larger particles are added.

The use of high pressure for molding the brick is desirable, as the high pressure assists in producing maximum interfitting. I employ a molding pressure of at least 1000 pounds per square inch, and preferably 5000 or better 10,000 pounds per square inch.

After molding, the brick are dried, preferably at a temperature of 100° to 300° C. This results in driving off excess moisture, but is not in any sense a burning or firing operation. The brick are now ready for use in unburned condition.

I am aware that it is not new to bond certain anhydrous non-plastic refractories with sodium silicate or organic binders and to use such bonded brick in furnace linings without previous firing. I have found that such unburned brick are lacking in refractoriness or strength, in resistance to slag or metal attack, and have undesirably high porosity or shrink in volume in service due to poor contact and poor interfitting of the constituent particles and the presence of excessive amounts of bonding substance between the particles. By selecting the proper size particles and densely compacting them under pressure exceeding 1000 pounds per square inch, I have been able to obtain desirable brick having the necessary particle interfitting without burning and with a minimum of bonding substance. Such brick can be made equal to or better than conventional burned brick of the same material. One example of such a brick composition is:

| | Per cent |
|---|---|
| Dead burned magnesite | 76 |
| Chrome ore | 20 |
| Ball clay | 2 |
| Sodium acid sulphate | 2 |
| | 100 |

A screen test of the brick mix shows:

| | Per cent |
|---|---|
| On 6 mesh per linear inch | 0 |
| Thru 6 on 10 mesh per linear inch | 15 |
| Thru 10 on 20 mesh per linear inch | 20 |
| Thru 20 on 35 mesh per linear inch | 15 |
| Thru 35 on 65 mesh per linear inch | 5 |
| Thru 65 mesh per linear inch | 45 |
| | 100 |

When molded under a pressure of 10,000 pounds per square inch and dried at 125° C., such brick have shown a brick specific gravity as high as 3.0 and cold crushing strengths up to 14,000 pounds per square inch.

The following cold crushing strengths (in pounds per square inch) have been obtained for commercial brick made according to the present invention:

| | |
|---|---|
| Chrome | 6,000 |
| Magnesia | 8,000 |
| Andalusite | 4,000 |
| Silica | 3,000 |

As brick having a cold crushing strength of about 2000 pounds per square inch may be shipped and installed commercially, it will be evident that the unburned brick of my invention are amply strong. The brick according to my invention are very dense, having a porosity of less than 20%.

According to my invention, I procure larger and smaller particles of ground non-plastic refractory, add a limited quantity of a proper binder, ordinarily in a solution which serves to moisten the mix, mold the brick, preferably under high pressure, and dry the molded brick. The brick is then ready for use in unfired condition, and may be inserted in a furnace lining exactly like a fired brick.

In stating percentages of non-plastic particles, I of course intend that these percentages shall be subject to deduction for the percentage of bond. Thus the suggested ranges of 45% to 65% (preferably 52% to 58%) of larger anhydrous non-plastic particles and 55% to 35% (preferably 48% to 42% of smaller anhydrous non-plastic particles are subject to deductions in each case for the percentage of bond.

All percentages mentioned herein are percentages by weight unless the context clearly indicates that they are percentages by volume, as in the case of porosity, void space, etc. All percentages are based upon the dried unfired brick which is ready for use in a furnace lining. Thus when I refer to a certain percentage of water soluble bond, I do not include the water which is used as a vehicle for the bond, and to moisten the mix, when the bond is added, but merely mean that, of the dried unfired brick, the bond comprises a certain percentage by weight.

A typical analysis of a suitable magnesia or dead burned magnesite is:

| | Per cent |
|---|---|
| MgO (by difference) | 84.50 |
| CaO | 4.50 |
| $Fe_2O_3$ | 5.00 |
| $Al_2O_3$ | 1.50 |
| $SiO_2$ | 4.00 |
| Loss on ignition | 0.50 |
| | 100.00 |

If lower quality be permissible, the lime may be greater than 7% but should not be within the range of calcined dolomite. Magnesites may fall as low as 60% to 65% MgO content if higher amounts of CaO and $Fe_2O_3$ or other basic oxides are present. The magnesites may be prepared for use by dead burning in kilns at about 1500° C. or by electrical fusion.

Whenever I mention chrome, I mean chrome ore of the type used in making refractory brick or calcined chrome ore. Sodium acid sulphate (sodium bisulphate) as mentioned herein may be the "nitre cake" of commerce. Sodium silicate as used in my invention may be the liquid variety, "water glass", or the solid variety. When I speak of the amount of sodium silicate to be used as a bond, I refer to the quantity of anhydrous sodium silicate. If a solution of sodium silicate or a hydrated solid sodium silicate be used, an increased amount of binder will be necessary to compensate for the water present. Various commercial sodium silcates have different ratios of $Na_2O$ to $SiO_2$, for example, 1:4; 1:2.4. Such silicates are all applicable as bonding agents.

When I state that the quantity of bond used is less than any specified percentage, I of course mean to indicate that an appreciable amount, less than that percentage, is employed.

In referring to my earlier patents, I intend to incorporate their disclosures herein by reference and make them a part hereof.

In view of my invention and disclosure variations and modifications to meet individual whim or particular need will doubtless become evident to others skilled in the art, to obtain all or part of the benefits of my invention without copying the structure shown, and I, therefore, claim all such in so far as they fall within the reasonable spirit and scope of my invention.

Having thus described my invention, what I claim as new and desire to secure by Letters Patent is:

1. The method of making a refractory of high density from anhydrous non-plastic material and a bonding substance, using anhydrous non-plastic particles of relatively larger and smaller grain sizes, which consists in mixing larger anhydrous non-plastic particles retained on a 30 mesh per linear inch screen with smaller anhydrous non-plastic particles and a bonding substance, while employing not more than a relatively small proportion of intermediate anhydrous non-plastic particles, in molding the mix in moist condition into a refractory shape, in drying the refractory shape and in subjecting the dried unburned refractory shape to firing temperature in a furnace structure during use.

2. The method of making a refractory of high density from anhydrous non-plastic material and a bonding substance, using anhydrous non-plastic particles of relatively larger and smaller grain sizes, which consists in mixing larger anhydrous non-plastic particles retained on a 30 mesh per linear inch screen with smaller anhydrous non-plastic particles and a bonding substance while employing not more than a relatively small proportion of intermediate anhydrous non-plastic particles, in molding the mix in moist condition under pressure into a refractory shape, in drying the refractory shape and in subjecting the dried unburned refractory shape to firing temperature in a furnace structure during use.

3. The method of making a refractory of high density from anhydrous non-plastic material and a bonding substance, using anhydrous non-plastic particles of relatively larger and smaller grain sizes, which consists in mixing larger anhydrous non-plastic particles retained on a 20 mesh per linear inch screen with smaller anhydrous non-plastic particles and a bonding substance, while employing not more than a relatively small proportion of intermediate anhydrous non-plastic particles, in molding the mix in moist condition under pressure into a refractory shape, in drying the refractory shape and in subjecting the dried unburned refractory shape to firing temperature in a furnace structure during use.

4. The method of making a refractory of high density from anhydrous non-plastic material and a bonding substance, using anhydrous non-plastic particles of relatively larger and smaller grain sizes, which consists in mixing larger anhydrous non-plastic particles retained on a 30 mesh per linear inch screen with smaller anhydrous non-plastic particles below 60 mesh per linear inch and a bonding substance, while employing not more than a relatively small proportion of intermediate anhydrous non-plastic particles, in molding the mix in moist condition under pressure into a refractory shape, in drying the refractory shape and in subjecting the dried unburned refractory shape to firing temperature in a furnace structure during use.

5. The method of making a refractory of high density from anhydrous non-plastic material and a water soluble bond, using anhydrous non-plastic particles of relatively larger and smaller grain sizes, which consists in mixing larger anhydrous non-plastic particles between 3 and 30 mesh per linear inch in the proportion of 45% to 65% with smaller anhydrous non-plastic particles below 50 mesh per linear inch in the proportion of 55% to 35%, and with an appreciable amount but less than 5% of a water soluble bond, maintaining the mixture free from insoluble bond, in molding the mixture in moist condition under a pressure exceeding 1000 pounds per square inch, in drying the mixture and in subjecting the dried unburned mixture to firing temperature in a furnace structure during use.

6. The method of making a refractory of high density from anhydrous non-plastic material and a water soluble bond, using anhydrous non-plastic particles of relatively larger and smaller grain sizes, which consists in mixing larger anhydrous non-plastic particles between 6 and 30 mesh per linear inch in the proportion of 45% to 65% with smaller anhydrous non-plastic particles below 50 mesh per linear inch in the proportion of 55% to 35%, and with an appreciable amount but less than 3% of sodium silicate, in molding the mixture in moist condition under a pressure exceeding 1000 pounds per square inch, in drying the mixture and in subjecting the dried unburned mixture to firing temperature in a furnace structure during use.

7. The method of making a refractory of high density from anhydrous non-plastic material and an organic bond, using anhydrous non-plastic particles of relatively larger and smaller grain sizes, which consists in mixing larger anhydrous non-plastic particles between 6 and 30 mesh per linear inch in the proportion of 45% to 65% with smaller anhydrous non-plastic particles below 50 mesh per linear inch in the proportion of 55% to 35%, and with an appreciable amount but less than 3% of an organic bond, in molding the mixture in moist condition under a pressure exceeding 1000 pounds per square inch, in drying the mixture and in subjecting the dried unburned mixture to firing temperature in a furnace structure during use.

8. A dry refractory body of anhydrous non-plastic material, said body having low porosity, being in unfired condition and suitable for use in unfired condition, and comprising a densely compacted mixture of larger anhydrous non-plastic particles capable of being retained on a screen of 30 mesh per linear inch and smaller anhydrous non-plastic particles capable of passing through a screen of 60 mesh per linear inch, in roughly equal proportions, and a bonding substance distributed through the densely compacted mixture.

9. A dry refractory brick of anhydrous non-plastic material, said brick having low porosity, being in unfired condition and suitable for use in unfired condition, and comprising a densely compacted mixture of about equal proportions of larger anhydrous non-plastic particles between 10 and 30 mesh per linear inch and smaller anhydrous non-plastic particles below 60 mesh per linear inch and a water soluble bond.

10. A non-plastic refractory brick comprising about 55% of larger anhydrous non-plastic particles between 10 and 30 mesh per linear inch, about 45% of smaller anhydrous non-plastic particles below 60 mesh per linear inch and a water soluble binder in dry form, the brick being of requisite cold strength for use in unfired condition.

11. A dry refractory brick having low porosity, being in unfired condition and suitable for use in unfired condition, comprising a densely compacted mixture of between 45% and 65% of larger anhydrous non-plastic particles between 3 and 30 mesh per linear inch and between 55% and 35% of smaller anhydrous non-plastic particles below 50 mesh per linear inch and an appreciable amount but less than 5% of a water soluble bond, and being free from insoluble bond.

12. A dry refractory brick having low porosity, being in unfired condition and suitable for use in unfired condition, comprising a densely compacted mixture of between 45% and 65% of larger anhydrous non-plastic particles between 3 and 30 mesh per linear inch and between 55% and 35% of smaller anhydrous non-plastic particles below 50 mesh per linear inch and an appreciable amount but less than 3% of sodium silicate.

13. A dry refractory brick having low porosity, being in unfired condition and suitable for use in unfired condition, comprising a densely compacted mixture of between 45% and 65% of larger anhydrous non-plastic particles between 3 and 30 mesh per linear inch and between 55% and 35% of smaller anhydrous non-plastic particles below 50 mesh per linear inch and an appreciable amount but less than 3% of organic binder.

14. A dry unfired cyanite brick whose cold strength exceeds 2000 pounds per square inch, comprising about equal proportions of larger anhydrous non-plastic particles between 6 and 30 mesh per linear inch tightly interfitted with smaller anhydrous non-plastic particles below 50 mesh per linear inch and a water soluble binder, so that the porosity does not exceed 20%.

RUSSELL P. HEUER.